US011322973B2

(12) United States Patent
Chien et al.

(10) Patent No.: US 11,322,973 B2
(45) Date of Patent: May 3, 2022

(54) POWER DEVICE AND OPERATING METHOD THEREOF

(71) Applicant: CYBER POWER SYSTEMS, INC., Taipei (TW)

(72) Inventors: Hung-Chun Chien, Taipei (TW); Yung-Hao Peng, Taipei (TW); Yu-Chen Kuo, Taipei (TW); Shang-Hsiu Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 172 days.

(21) Appl. No.: 16/842,032

(22) Filed: Apr. 7, 2020

(65) Prior Publication Data

US 2021/0091594 A1 Mar. 25, 2021

(30) Foreign Application Priority Data

Sep. 20, 2019 (CN) .......................... 201910894211.7

(51) Int. Cl.
*H02J 9/00* (2006.01)
*H02J 9/06* (2006.01)
*G05F 1/10* (2006.01)
(52) U.S. Cl.
CPC . *H02J 9/06* (2013.01); *G05F 1/10* (2013.01)
(58) Field of Classification Search
CPC ..................................... H02J 9/06; G05F 1/10
USPC ......................................................... 307/64
See application file for complete search history.

(56) References Cited

U.S. PATENT DOCUMENTS

| 2009/0150818 | A1  | 6/2009  | Bakhreiba et al. |
|--------------|-----|---------|------------------|
| 2010/0250160 | A1* | 9/2010  | Spitaels ................. G05B 15/02 |
|              |     |         | 702/61 |
| 2013/0300373 | A1  | 11/2013 | Vivanco-Sarabia et al. |
| 2017/0033559 | A1* | 2/2017  | Chien ..................... G06F 1/266 |

FOREIGN PATENT DOCUMENTS

| TW | 200516379 A | 5/2005 |
| TW | M540306 U   | 4/2017 |

* cited by examiner

*Primary Examiner* — Richard Tan
(74) *Attorney, Agent, or Firm* — Bacon & Thomas, PLLC

(57) ABSTRACT

A power device and an operating method thereof are provided. The power device comprises a communication interface and a control circuit. The control circuit is configured to connect a network through the communication interface, and to execute a web server program to provide a web-based user interface. The web-based user interface is configured to provide a plurality of web pages, and the web pages are configured to present a plurality of different related information of the power device. The web-based user interface is further configured to provide a virtual button. When the control circuit determines that the virtual button is clicked once, the control circuit collects the related information from different addresses corresponding to the related information in a memory space, and packages the collected related information as a single file, so as to perform a follow-up process on this single file.

27 Claims, 8 Drawing Sheets

POWER DEVICE AND OPERATING METHOD THEREOF

BACKGROUND OF THE INVENTION

Field of the Invention

The present invention relates to the field of power technologies, and more particularly, to a power device and an operating method thereof.

Description of Related Art

Power devices, such as uninterruptible power systems (UPSs), power distribution units (PDUs), or automatic transfer switches (ATSs) are used to provide operation power to at least one load, so that the loads can operate in normal. Most of the current power devices provide a web-based user interface, the web-based user interface is configured to provide a plurality of web pages, and the web pages are configured to respectively present a plurality of different related information of the power device, so that a user can perform remote management. However, when an abnormality or malfunction occurs in the power device, the user often needs to spend a lot of time to collect related information of the power device from the web pages, so as to provide the collected related information to the manufacturer of the power device for analysis. Therefore, how to enable users to collect such related information in an easier way has become an important issue.

SUMMARY OF THE INVENTION

An object of the present invention is to provide a power device, which provides a function of collecting all related information of the power device with one-click.

Another object of the present invention is to provide an operating method of the abovementioned power device.

To achieve the above object, the present invention provides a power device. The power device comprises a communication interface and a control circuit. The control circuit is configured to connect to a network through the communication interface and to execute a web server program to provide a web-based user interface. The web-based user interface is configured to provide a plurality of web pages, and the web pages are configured to respectively present a plurality of different related information of the power device. The web-based user interface is further configured to provide a virtual button. When the control circuit determines that the virtual button is clicked once, the control circuit collects the related information from different addresses corresponding to the related information in a memory space, and packages the collected related information as a single file, so as to perform a follow-up process on this single file.

To achieve the above another object, the present invention further provides an operating method of a power device. The operating method comprises the following step: executing a web server program to provide a web-based user interface, the web-based user interface being configured to provide a plurality of web pages, the web pages being configured to respectively present a plurality of different related information of the power device; determining whether a virtual button provided by the web-based user interface is clicked once; when the determination is yes, collecting the related information from different addresses corresponding to the related information in a memory space, and packaging the collected related information as a single file; and performing a follow-up process on the single file In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
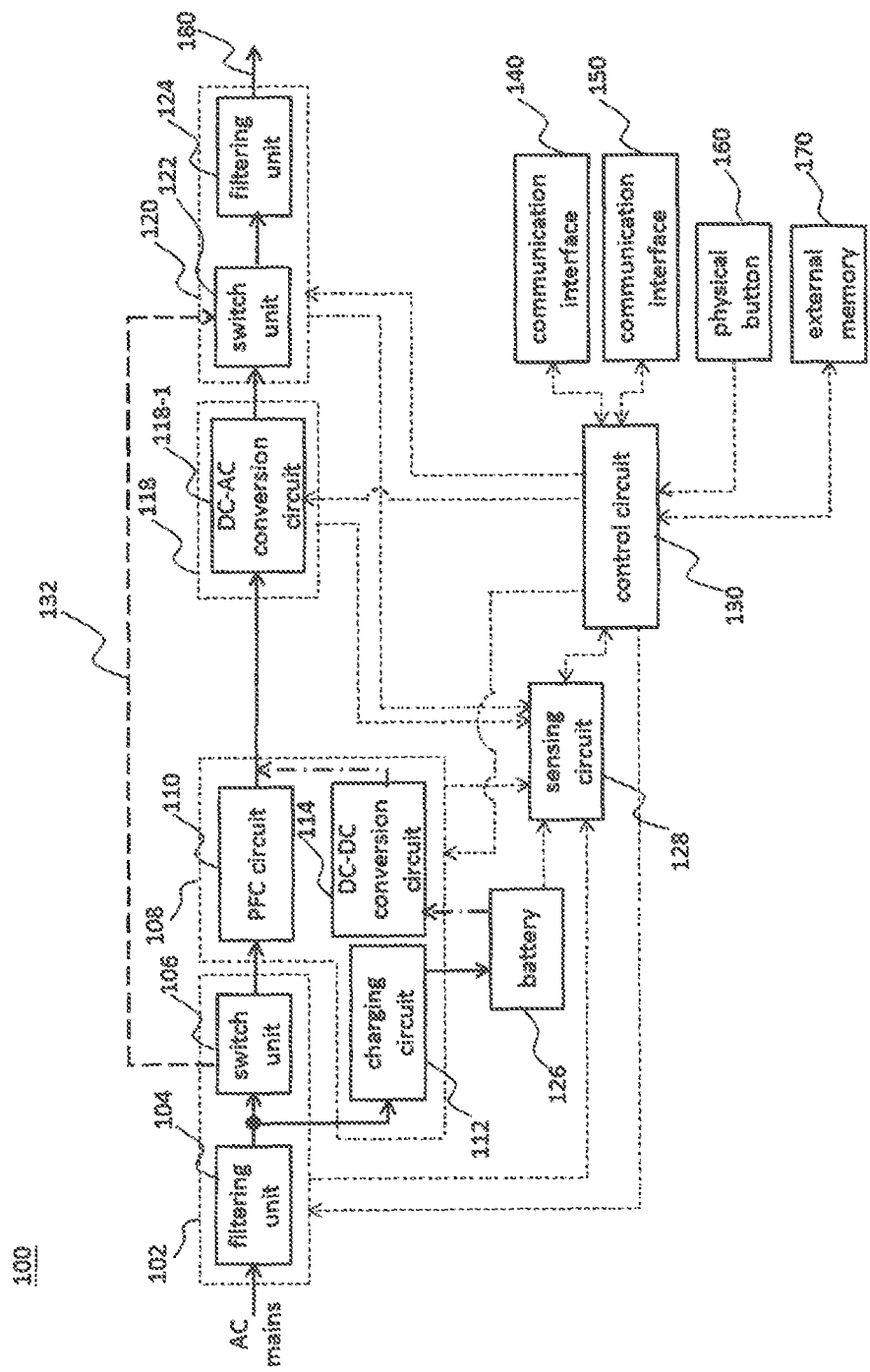
FIG. 1 shows a power device according to an embodiment of the present invention.

FIG. 1 shows a power device according to an embodiment of the present invention. Referring to FIG. 1, the input terminal of the power device 100 is electrically coupled to AC mains, and the output terminal 180 of the power device 100 is configured to provide operating power to at least one load (not shown). As shown in FIG. 1, the power device 100 is an uninterruptible power system and is an on-line uninterruptible power system. The on-line uninterruptible power system comprises an input unit 102, a first voltage conversion unit 108, a second voltage conversion unit 118, an output unit 120, a battery 126, a sensing circuit 128, a control circuit 130, a communication interface 140, a communication interface 150, a physical button 160 and an external memory 170. In this case, the input unit 102 comprises a filtering unit 104 and a switch unit 106. The first voltage conversion unit 108 comprises a power factor correction circuit (PFC circuit) 110, a charging circuit 112, and a DC-DC conversion circuit 114. The second voltage conversion unit 118 is implemented by a DC-AC conversion circuit 118-1, and the output unit 120 comprises the switch unit 122 and the filtering unit 124.

The control circuit 130 is electrically coupled to the input unit 102, the first voltage conversion unit 108, the second voltage conversion unit 118, the output unit 120, the sensing circuit 128, the communication interface 140, the communication interface 150, and the external memory 170, so as to control their operations. For example, the control circuit 130 is configured to control the operation of the switch unit 106 to electrically couple the output of the filtering unit 104 to the bypass path 132 or to the input of the power factor correction circuit 110. For another example, the control circuit 130 is further configured to control the operation of the switch unit 122 to electrically couple the input of the filtering unit 124 to the output of the DC-AC conversion circuit 118-1 or to the bypass path 132. In addition, the control circuit 130 is also electrically coupled to the physical button 160.

The sensing circuit 128 is electrically coupled to the input unit 102, the first voltage conversion unit 108, the second voltage conversion unit 118, the output unit 120, the battery 126, and the control circuit 130, and is configured to sense the input unit 102, the first voltage conversion unit 108, the second voltage conversion unit 118, the output unit 120, and the battery 126 to provide sensing data to the control circuit 130, so that the control circuit 130 can perform corresponding operations.

In this case, the communication interface 140 is implemented by a network interface, and the communication interface 150 is configured to electrically couple to a storage medium, such as a USB storage (universal serial bus storage) or a SD memory card (secure digital memory card). The control circuit 130 is configured to connect a network (not shown) through the communication interface 140, and to execute a web server program to provide a web-based user interface. The web-based user interface is implemented by a web interface, a SNMP interface (simple network management protocol interface) or a Telnet interface.

Figure 2:
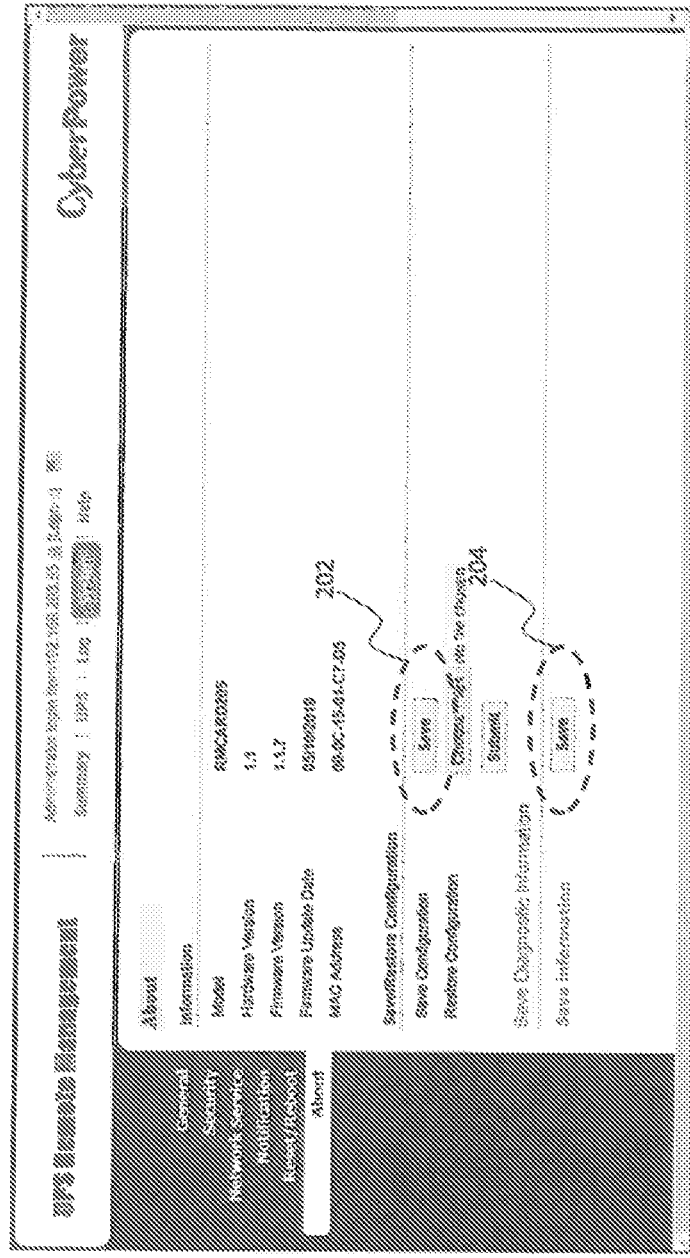
FIG. 2 shows an embodiment of the web-based user interface.

FIG. 2 shows an embodiment of the web-based user interface. Referring to FIG. 2, the web-based user interface is configured to provide a plurality of web pages, and the web pages are configured to respectively present a plurality of different related information of the power device 100. The related information comprises at least two of error codes, power measurement records (e.g., input voltage, output voltage, input frequency, output frequency), product setting parameters (e.g., input voltage tolerance range, input frequency tolerance range), operation records, network login records, a firmware version, a model name, and a serial number. As shown in FIG. 2, the web-based user interface is presenting "About" information in the "System" web page, and the presented contents comprise the model name, the hardware version, the firmware version, etc., of the power device 100. In addition, this web page also provides two virtual buttons for saving information, labeled by 202 and 204, respectively. The virtual button 202 is configured for saving the configuration information of the power device 100, and the virtual button 204 is configured for collecting all related information of the power device 100 with one-click (will be described later).

Figure 3:
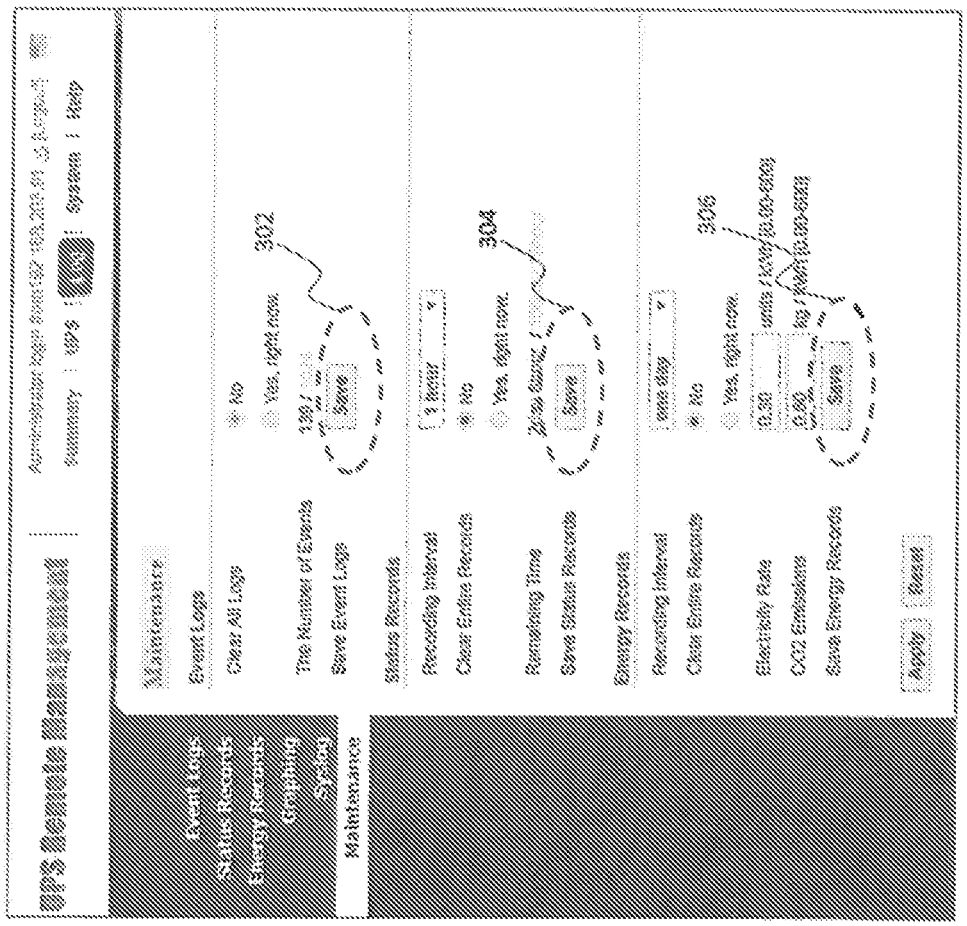
FIG. 3 shows another web page of the aforementioned web-based user interface.

FIG. 3 shows another web page of the aforementioned web-based user interface. As shown in FIG. 3, the web-based user interface is presenting "Maintenance" information in the "Log" web page, and the presented contents comprise three kinds of the related information of the power device 100, including event logs, status records, and energy records. In addition, this web page also provides three virtual buttons for saving the above three kinds of different information in this web page, labeled by 302, 304 and 306, respectively.

Similarly, in other web pages of the aforementioned web-based user interface, virtual buttons for saving related information of the power device 100 are also provided. When one of the related information is required, the user just needs to click a corresponding virtual bottom for saving the said information. As shown in FIG. 3, when the information of the event logs is required, the user just needs to click the virtual button 302 for saving this information.

However, referring to FIG. 2 again, when an abnormality or malfunction occurs in the power device 100, the user needs to collect all related information of the power device 100 from all web pages of the aforementioned web-based user interface. In this situation, the user just needs to click the virtual button 204 once. The details of the operation thereof will be detailed later. Referring to FIGS. 1 and 2, when the control circuit 130 determines that the virtual button 204 is clicked once, the control circuit 130 collects all related information of the power device 100 from different addresses corresponding to the related information in a memory space. This will be described with Table 1.

Table 1 is used to illustrate the correspondence between different addresses in the aforementioned memory space and the contents thereof. For convenience of explanation, Table 1 only lists some related information of the power device 100. In addition, the memory space is provided by the external memory 170 or an internal memory (not shown) of the control circuit 130. As shown in Table 1, different addresses of the memory space are recorded with different related

TABLE 1

| Address | Content |
|---|---|
| 0x40000001~0x40001000 | . . . |
| 0x40001000~0x40001010 | Error codes |
| 0x40001010~0x40004000 | . . . |
| 0x40004000~0x40006000 | Power measurement records |
| 0x40006000~0x40008000 | . . . |
| 0x40008000~0x40009000 | Product setting parameters |
| 0x40009000~0x4000A000 | . . . |
| 0x4000A000~0x4000B000 | Network login records |
| 0x4000B000~0x4000C000 | . . . |
| 0x4000C000~0x4000C800 | Firmware version |
| 0x4000C800~0x40010000 | . . . |
| 0x40010000~0x40010010 | Model name |
| 0x40010010~0x40011000 | . . . | information of the power device 100, including the error codes, the power measurement records, the product setting parameters, the network login records, the firmware version, the model name, etc., of the power device 100. When the control circuit 130 determines that the virtual button 204 is clicked once, the control circuit 130 collects all related information of the power device 100 from different addresses corresponding to the related information in a memory space.

After the control circuit 130 collects all related information of the power device 100, the control circuit 130 packages all collected related information into a single file, so as to perform a follow-up process on this single file. The follow-up process may comprise storing the single file to a desktop computer or a mobile device (e.g., a notebook computer, a tablet computer or a mobile phone) connected to the power device 100. Certainly, the follow-up process may comprise storing the single file to a storage medium (not shown) electrically coupled to the power device 100 through the communication interface 150, emailing the single file to a customer service email inbox of the manufacturer, uploading the single file to a cloud server, etc. However, this is not intended to limit the present invention. It is worth mentioning that if the follow-up process is to email the single file to a customer service email inbox of the manufacturer, or upload the single file to a cloud server, the word "Save" displayed on the virtual button 204 can be changed to other words to present its functions more intuitively, for example, to change to "Submit".

Although in the aforementioned embodiments, the function of collecting all related information of the power device 100 with one-click is enabled by the virtual button 204, this is not intended to limit the present invention. Those of ordinary skill in the art should know that such function can also be enabled by a physical button. Referring to FIG. 1 again, when the control circuit 130 determines that the physical button 160 is pressed once, the control circuit 130 collects all related information from different addresses corresponding to the related information in the memory space, and packages the collected related information as the single file, so as to perform the follow-up process on this single file.

In addition, although in the aforementioned embodiments the power device 100 comprises the filtering unit 104, the filtering unit 124, the communication interface 150, the physical button 160 and the external memory 170, whether or not to adopt these components can be determined according to actual design requirements. In addition, it should be noted that the web pages presented by the aforementioned web-based user interface and the contents presented by each web page are only used as examples, and are not intended to limit the present invention.

Figure 4:
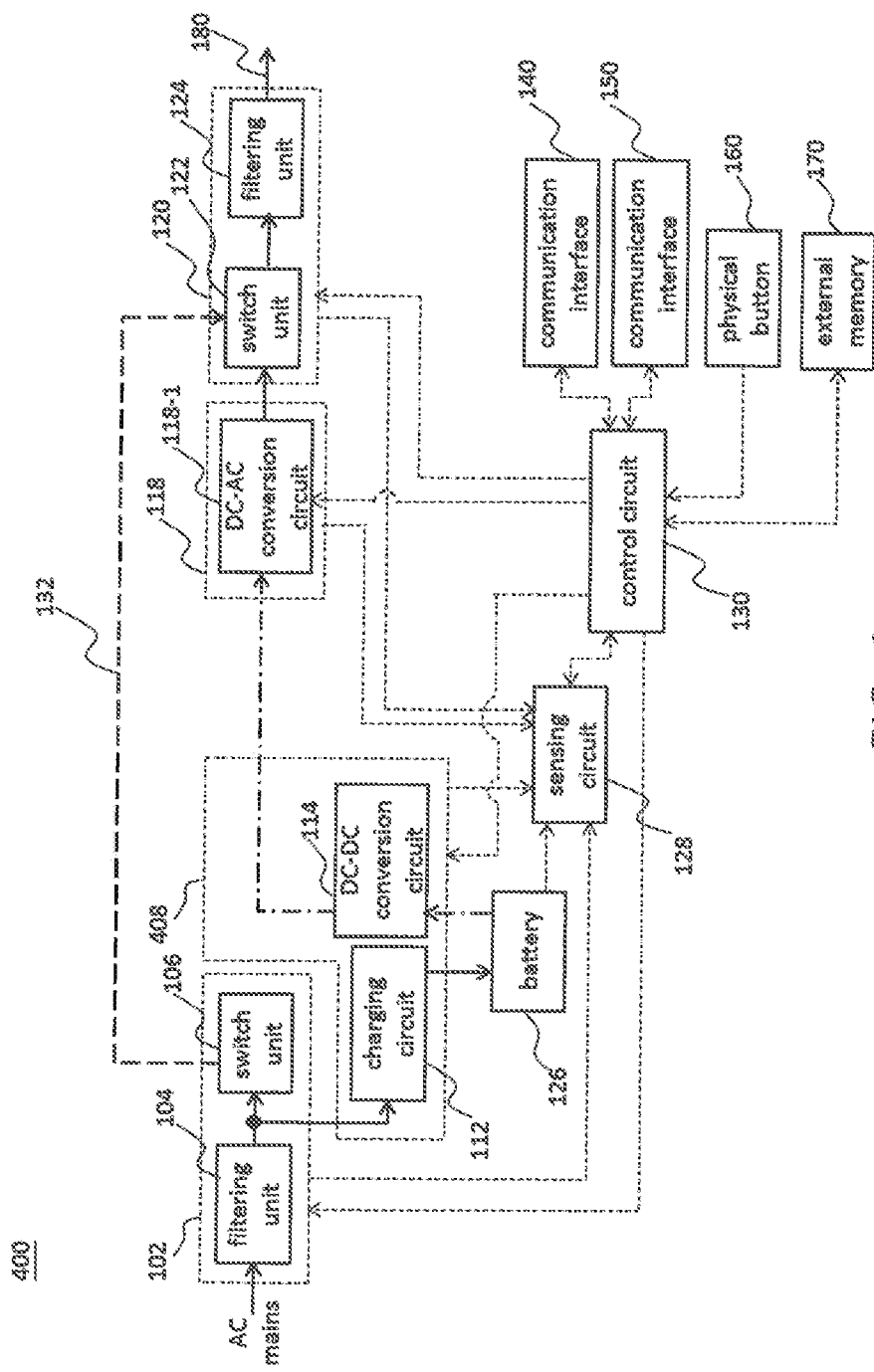
FIG. 4 shows a power device according to another embodiment of the present invention.
Figure 5:
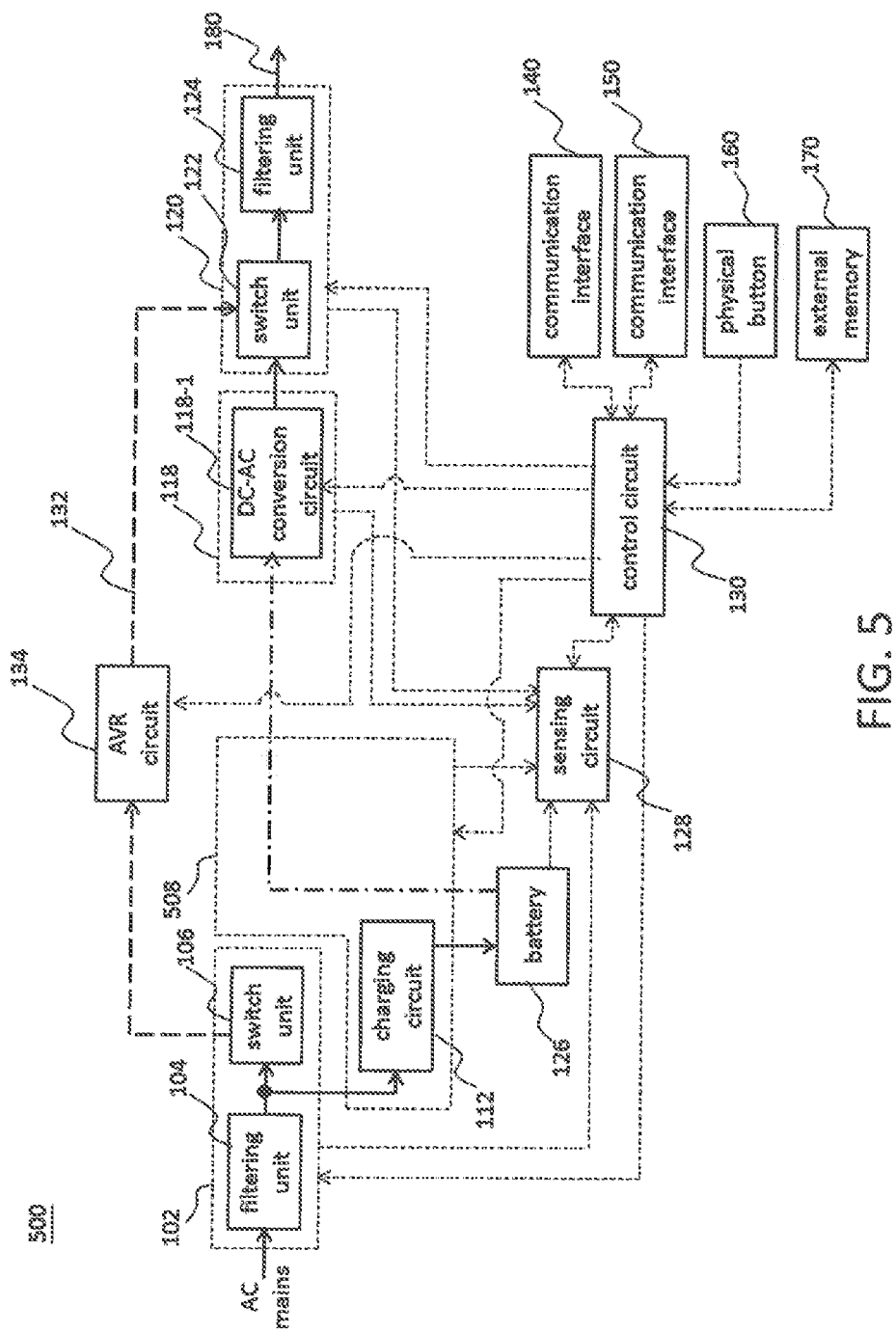
FIG. 5 shows a power device according to still another embodiment of the present invention.

Similarly, the function of collecting all related information of the power device with one-click can also be applied to the uninterruptible power systems with different architectures, which are illustrated in FIGS. 4 and 5, respectively. FIG. 4 shows a power device according to another embodiment of the present invention. In FIG. 4, the same reference numerals as those in FIG. 1 are denoted as the same members. As shown in FIG. 4, the power device 400 is an uninterruptible power system and is an off-line uninterruptible power system. Compared with the power device 100 shown in FIG. 1, the first voltage conversion unit 408 of the power device 400 shown in FIG. 4 is composed of a charging circuit 112 and a DC-DC conversion circuit 114.

FIG. 5 shows a power device according to still another embodiment of the present invention. In FIG. 5, the same reference numerals as those in FIG. 1 are denoted as the same members. As shown in FIG. 5, the power device 500 is an uninterruptible power system and is a line-interactive uninterruptible power system. Compared with the power device 100 shown in FIG. 1, the first voltage conversion unit 508 of the power device 500 shown in FIG. 5 is implemented by the charging circuit 112, and the power device 500 further comprises an automatic voltage regulation circuit (AVR circuit) 134.

Figure 6:
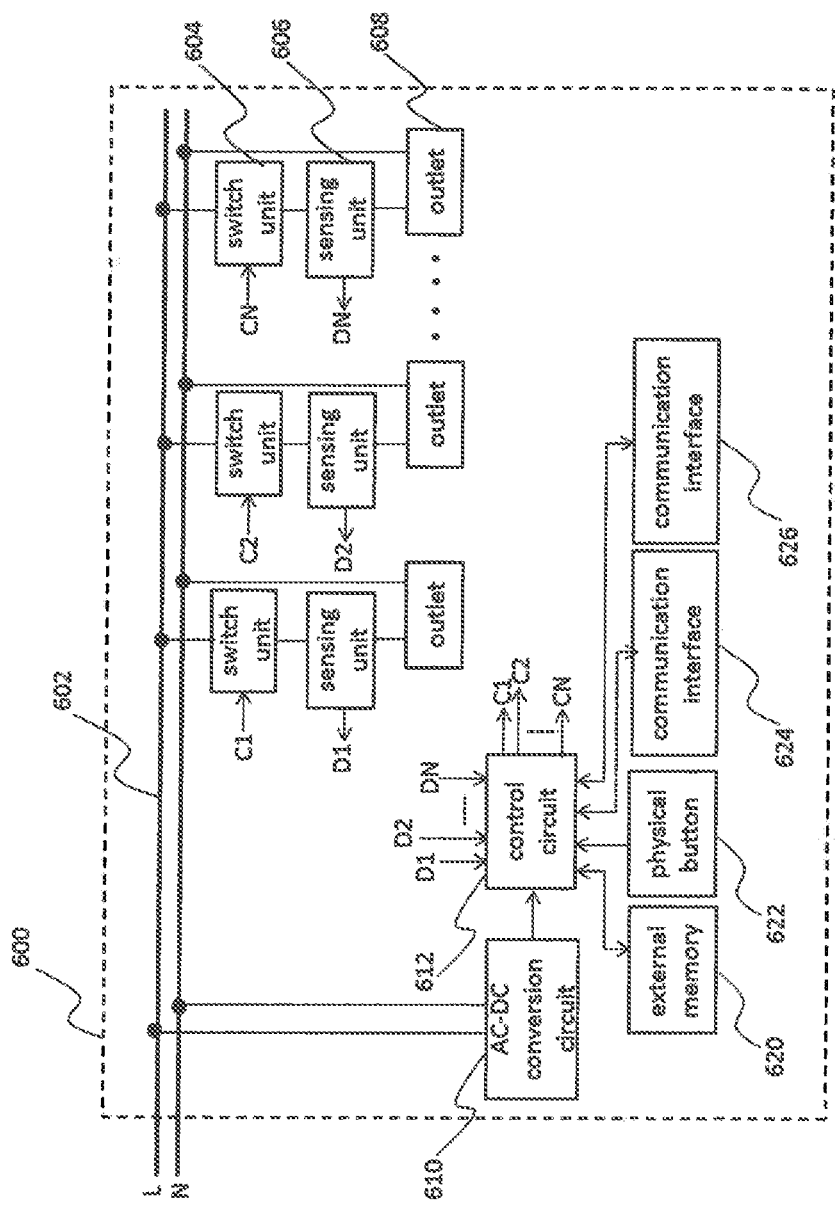
FIG. 6 shows a power device according to yet another embodiment of the present invention.
Figure 7:
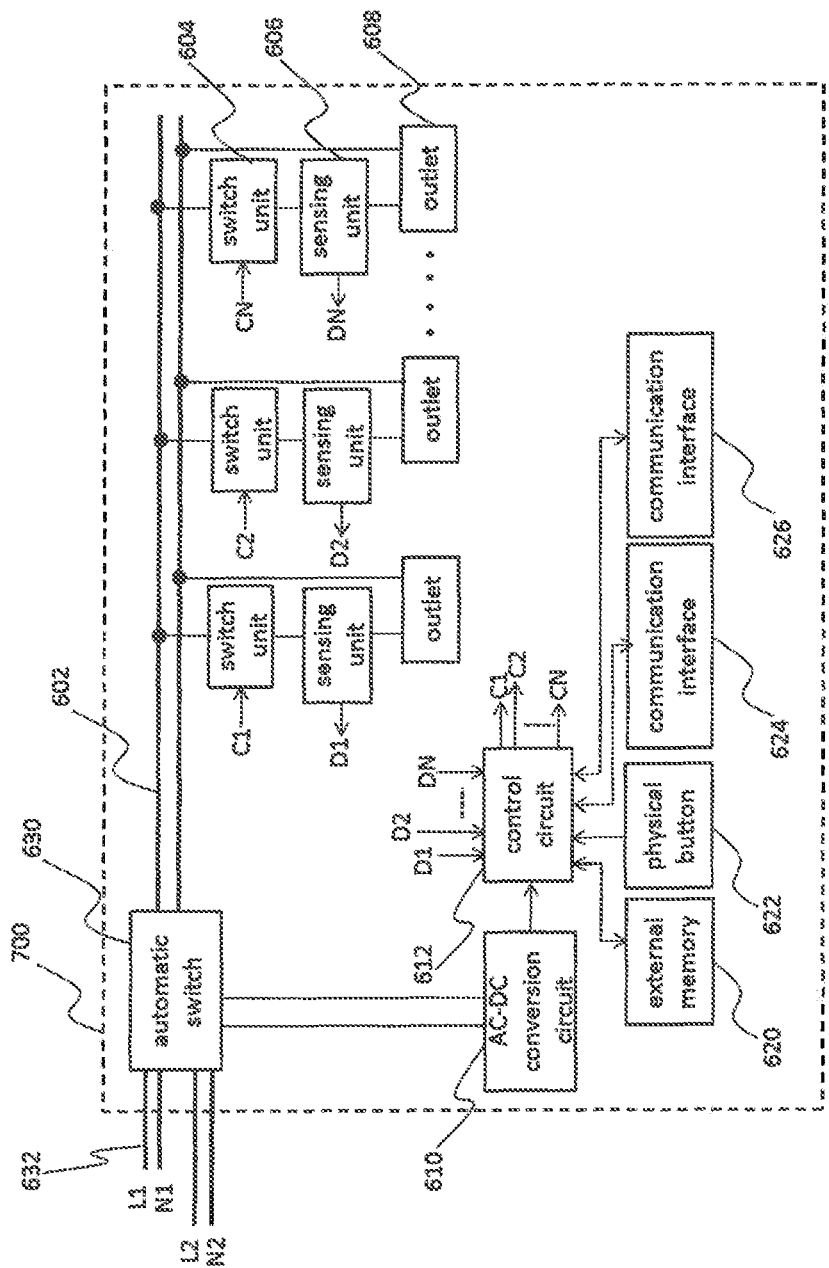
FIG. 7 shows a power device according to still another embodiment of the present invention.

Similarly, the function of collecting all related information of the power device with one-click can also be applied to the power distribution units and the automatic transfer switches, which are illustrated in FIGS. 6 and 7, respectively.

FIG. 6 shows a power device according to yet another embodiment of the present invention. As can be seen from the circuit architecture shown in FIG. 6, the power device 600 is a power distribution unit. The power distribution unit comprises two conductors 602, a plurality of switch units 604, a plurality of sensing units 606, a plurality of outlets 608, an AC-DC conversion circuit 610, a control circuit 612, an external memory 620, a physical button 622, a communication interface 624, and a communication interface 626. One of the conductors 602 is electrically coupled to the AC power source L, and the other conductor 602 is electrically coupled to the neutral line N. Each of the outlets 608 is electrically coupled to the neutral line N through one of the conductors 602, and each of the outlets 608 is electrically coupled to the AC power source L through one of the sensing units 606, one of the switch units 604 and the other of the conductors 602 sequentially. The electrical connection of the outlets 608 is not limited to the present invention. For example, each of the outlets 608 can be electrically coupled to the AC power source L through one of the conductors 602, and each of the outlets 608 can be electrically coupled to the neutral line N through one of the sensing units 606, one of the switch units 604 and the other of the conductors 602 sequentially.

In addition, the input of the AC-DC conversion circuit 610 is electrically coupled to the two conductors 602. The control circuit 612 is electrically coupled to the output of the AC-DC conversion circuit 610, the external memory 620, the physical button 622, the communication interface 624, the communication interface 626, each switch unit 604, and each sensing unit 606. Each sensing unit 606 is configured to measure current and provide a sensing result (shown as D1-DN respectively, where N is a natural number) to the control circuit 612. In addition, the control circuit 612 is configured to control the operations of the external memory 620, the communication interface 624 and the communication interface 626, and output control signals C1-CN (where N is a natural number) to respectively control the on/off state of the switch units 604.

In this case, the communication interface 624 is implemented by a network interface, and the communication interface 626 is configured to electrically couple to a storage medium, such as a USB storage or a SD memory card. The control circuit 612 is configured to connect a network (not shown) through the communication interface 624, and to execute a web server program to provide a web-based user interface, such as the web-based user interface shown in FIGS. 2 and 3. Certainly, the information contents of the provided web-based user interface needs to be modified according to the actual design of the power distribution unit. However, the provided web-based user interface still needs to have a virtual button 204 to perform the function of collecting all related information of the power device 600 with one-click.

In this way, when the control circuit 612 determines that the virtual button 204 is clicked once or the physical button 622 is pressed once, the control circuit 612 collects all related information of the power device 600 from different addresses corresponding to the related information in the memory space, and packages the collected related information as a single file, so as to perform a follow-up process on this single file. The memory space is provided by the external memory 620 or an internal memory (not shown) of the control circuit 612. In addition, although in this embodiment the power device 600 comprises the external memory 620, the physical button 622, and the communication interface 626, whether or not to adopt these components can be determined according to actual design requirements.

FIG. 7 shows a power device according to still another embodiment of the present invention. In FIG. 7, the same reference numerals as those in FIG. 6 are denoted as the same members. As can be seen from the circuit architecture shown in FIG. 7, the power device 700 is an automatic transfer switch. Compared to the power device 600 shown in FIG. 6, the power device 700 shown in FIG. 7 further employs an automatic switch 630. The automatic switch 630 is electrically coupled to the AC power source L, the neutral line N1, the AC power source L2, and the neutral line N2 through four conductors 632, respectively. The AC power source L1 and the neutral line N1 are configured to provide a first power input, and the AC power source L2 and the neutral line N2 are configured to provide a second power input. The automatic switch 630 is configured to transfer one of the first power input and the second power input to the AC-DC conversion circuit 610 and the two conductors 602, and determine whether the transferred power input fails. When the automatic switch 630 determines that the transferred power input fails, the automatic switch 630 immediately switches to transfer the other power input to the AC-DC conversion circuit 610 and the two conductors 602.

In this embodiment, the control circuit 612 is configured to connect a network (not shown) through the communication interface 624, and to execute a web server program to provide a web-based user interface, such as the web-based user interface shown in FIGS. 2 and 3. Certainly, the information contents of the provided web-based user interface needs to be modified according to the actual design of the automatic transfer switch. However, the provided web-based user interface still needs to have a virtual button 204 to perform the function of collecting all related information of the power device 700 with one-click.

Figure 8:
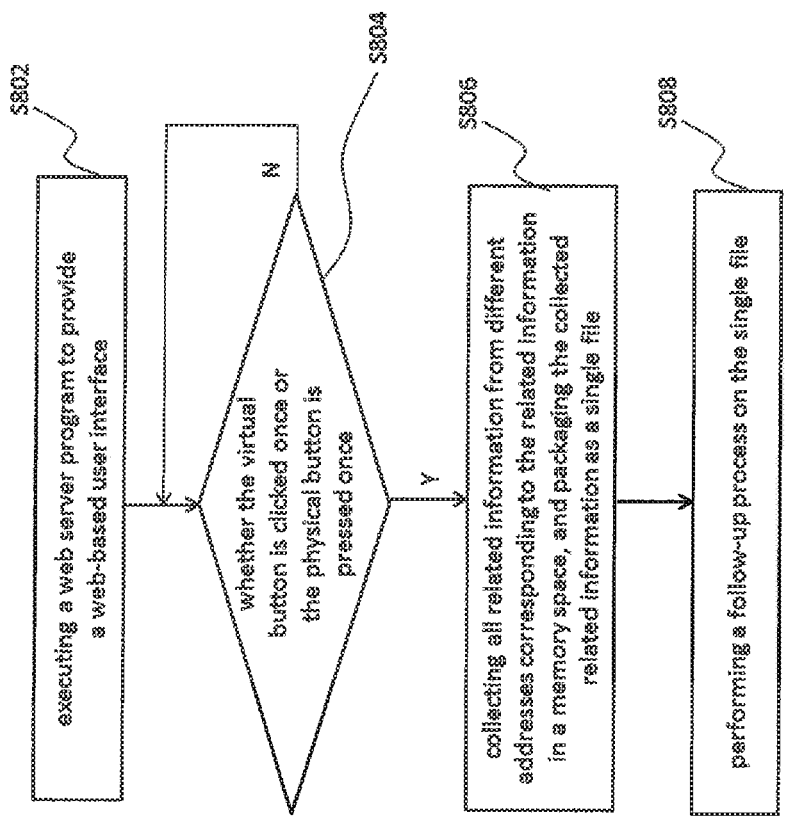
FIG. 8 is a flow chart of an operating method of a power device according to an embodiment of the present invention.

From the teachings of the above embodiments, those having ordinary skill in the art can conclude some basic operations of the power device of the present invention, as illustrated in FIG. 8. FIG. 8 is a flow chart of an operating method of a power device according to an embodiment of the present invention. As shown in FIG. 8, the operating method comprises the following steps. First, a web server program is executed to provide a web-based user interface (as shown in step S802), wherein the web-based user interface is configured to provide a plurality of web pages, and the web pages are configured to respectively present a plurality of different related information of the power device. Next, it is determined whether the physical button is pressed once or the virtual button provided by the web-based user interface is clicked once (as shown in step S804), wherein the virtual button is configured to perform the function of collecting all related information of the power device with one-click. In step S804, when the determination result is no, the process returns to step S804. On the other hand, when the determination result is yes, all related information is collected from different addresses corresponding to the related information in a memory space, and the collected related information is packaged into a single file (as shown in step S806). Afterward, a follow-up process is performed on this single file (as shown in step S808).

Certainly, if the power device does not have the aforementioned physical button, then in step S804 it is only needs to determine whether the virtual button is clicked once.

In summary, since the power device of the present invention provides the function of collecting all related information of the power device with one-click, the user can collect all related information of the power device in an easier way when an abnormality or malfunction occurs in the power device.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power device, comprising:
a communication interface; and
a control circuit, configured to connect a network through the communication interface, and to execute a web server program to provide a web-based user interface, the web-based user interface being configured to provide a plurality of web pages, the web pages being configured to respectively present a plurality of different related information of the power device, the web-based user interface being further configured to provide a virtual button, wherein when the control circuit determines that the virtual button is clicked once, the control circuit collects the plurality of different related information from different addresses corresponding to the plurality of different related information in a memory space, and packages the collected related information as a single file, so as to perform a follow-up process on the single file.

2. The power device as claimed in claim 1, wherein the power device further comprises a physical button, when the control circuit determines that the physical button is pressed once, the control circuit collects the plurality of different related information from different addresses corresponding to the plurality of different related information in the memory space, and packages the collected related information as the single file, so as to perform the follow-up process on the single file.

3. The power device as claimed in claim 1, wherein the plurality of different related information comprises at least two of error codes, power measurement records, product setting parameters, operation records, network login records, a firmware version, a model name, and a serial number.

4. The power device as claimed in claim 1, wherein the web-based user interface is implemented by a web interface, a SNMP interface, or a Telnet interface.

5. The power device as claimed in claim 1, wherein the follow-up process comprises storing the single file to a desktop computer or a mobile device connected to the power device.

6. The power device as claimed in claim 5, wherein the mobile device comprises a notebook computer, a tablet computer, or a mobile phone.

7. The power device as claimed in claim 1, wherein the follow-up process comprises emailing the single file to a customer service email inbox.

8. The power device as claimed in claim 1, wherein the follow-up process comprises uploading the single file to a cloud server.

9. The power device as claimed in claim 1, wherein the follow-up process comprises storing the single file to a storage medium electrically coupled to the power device.

10. The power device as claimed in claim 9, wherein the storage medium comprises a USB storage or a SD memory card.

11. The power device as claimed in claim 1, wherein the memory space is provided by an internal memory of the control circuit.

12. The power device as claimed in claim 1, wherein the memory space is provided by an external memory of the control circuit.

13. The power device as claimed in claim 1, wherein the power device comprises a power distribution unit, an automatic transfer switch, or an uninterruptible power system.

14. The power device as claimed in claim 13, wherein the uninterruptible power system comprises an input unit, a first voltage conversion unit, a second voltage conversion unit, an output unit, a battery, and a sensing circuit, the sensing circuit is configured to sense the input unit, the first voltage conversion unit, the second voltage conversion unit, the output unit, and the battery, and the control circuit is configured to control the operations of the input unit, the first voltage conversion unit, the second voltage conversion unit, the output unit, and the sensing circuit.

15. The power device as claimed in claim 14, wherein the uninterruptible power system is an on-line uninterruptible power system, the input unit comprises a first switch unit, the output unit comprises a second switch unit, the second voltage conversion unit comprises a DC-AC conversion circuit, and the first voltage conversion unit comprises a power factor correction circuit, a charging circuit, and a DC-DC conversion circuit.

16. The power device as claimed in claim 14, wherein the uninterruptible power system is an off-line uninterruptible power system, the input unit comprises a first switch unit, the output unit comprises a second switch unit, the second voltage conversion unit comprises a DC-AC conversion circuit, and the first voltage conversion unit is composed of a charging circuit and a DC-DC conversion circuit.

17. The power device as claimed in claim 14, wherein the uninterruptible power system is a line-interactive uninterruptible power system, the line-interactive uninterruptible power system further comprises an automatic voltage regulation circuit, the input unit comprises a first switch unit, the output unit comprises a second switch unit, the second voltage conversion unit comprises a DC-AC conversion circuit, and the first voltage conversion unit is a charging circuit.

18. An operating method of a power device, comprising:
executing a web server program to provide a web-based user interface, the web-based user interface being configured to provide a plurality of web pages, the web pages being configured to respectively present a plurality of different related information of the power device;
determining whether a virtual button provided by the web-based user interface is clicked once;
when the determination is yes, collecting the plurality of different related information from different addresses corresponding to the plurality of different related information in a memory space, and packaging the collected related information as a single file; and
performing a follow-up process on the single file.

19. The operating method of the power device according to claim 18, wherein the power device further comprises a physical button, and the operating method further comprises:
determining whether the physical button is pressed once;
when the determination is yes, collecting the plurality of different related information from different addresses corresponding to the plurality of different related information in the memory space, and packaging the collected related information as the single file; and
performing the follow-up process on the single file.

20. The operating method of the power device according to claim 18, wherein the plurality of different related information comprises at least two of error codes, power measurement records, product setting parameters, operation records, network login records, a firmware version, a model name, and a serial number.

21. The operating method of the power device according to claim 18, wherein the follow-up process comprises storing the single file to a desktop computer or a mobile device connected to the power device.

22. The operating method of the power device according to claim 18, wherein the follow-up process comprises emailing the single file to a customer service email inbox.

23. The operating method of the power device according to claim 18, wherein the follow-up process comprises uploading the single file to a cloud server.

24. The operating method of the power device according to claim 18, wherein the follow-up process comprises storing the single file to a storage medium electrically coupled to the power device.

25. The operating method of the power device according to claim 18, wherein the memory space is provided by an internal memory of the control circuit.

26. The operating method of the power device according to claim 18, wherein the memory space is provided by an external memory of the control circuit.

27. The operating method of the power device according to claim 18, wherein the power device comprises a power distribution unit, an automatic transfer switch, or an uninterruptible power system.

* * * * *